United States Patent
Brainch et al.

(10) Patent No.: US 6,274,215 B1
(45) Date of Patent: Aug. 14, 2001

(54) AERODYNAMIC ARTICLE WITH PARTIAL OUTER PORTION AND METHOD FOR MAKING

(75) Inventors: Gulcharan S. Brainch, West Chester; Michael J. Danowski, Cincinnati; Jonathan P. Clarke, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/217,661

(22) Filed: Dec. 21, 1998

(51) Int. Cl.$^7$ .................... B32B 3/14; F01D 5/14
(52) U.S. Cl. .................. 428/77; 156/297; 415/115
(58) Field of Search ................. 428/178, 172, 428/188, 78, 77, 212, 174; 244/124, 123; 156/60, 297, 308.4, 310; 264/241, 254; 415/115; 416/97 A

(56) References Cited

U.S. PATENT DOCUMENTS

| | | | |
|---|---|---|---|
| 3,462,330 | * 8/1969 | Greig et al. | 428/178 |
| 4,055,705 | 10/1977 | Stecura et al. | 428/633 |
| 5,236,745 | 8/1993 | Gupta et al. | 427/454 |
| 5,458,461 | 10/1995 | Lee et al. | 416/97 R |

\* cited by examiner

*Primary Examiner*—Donald J. Loney
(74) *Attorney, Agent, or Firm*—Andrew C. Hess; Rodney M. Young

(57) ABSTRACT

An article having a design external aerodynamic shape includes a body with a body external surface and an outer portion external surface of an outer portion bonded with a part of but less than substantially all of the body surface. The external surfaces of the body and outer portion each define less than the design external aerodynamic shape. However, together they define such shape. The article is made by selecting the design external aerodynamic shape from an existing article having a first body and a first outer portion. A replacement outer portion is selected in an amount less than the first outer portion and bonded with a region less than substantially all of a replacement body external surface. The replacement body has a replacement body external surface and replacement body external shape different from the first body substantially by that amount. The replacement body is made with the replacement body external shape. Then the replacement outer portion is bonded with the region of the replacement body external surface. The result is that the external surfaces of the replacement body and replacement outer portion together define the design external aerodynamic shape.

9 Claims, 2 Drawing Sheets

AERODYNAMIC ARTICLE WITH PARTIAL OUTER PORTION AND METHOD FOR MAKING

BACKGROUND OF THE INVENTION

This invention relates to an aerodynamic shaped article and, more particularly, to such an article with an environmental resistant protective layer on an outer surface.

Various types of dynamic apparatus operate with a flow of fluid to generate power, frequently passing the fluid over an aerodynamic surface. One example of such apparatus is a gas turbine engine in which the fluid is air along with products of combustion resulting from the combustion of fuel. Aerodynamic surfaces in turbine engines include airfoils found in blading members such as rotating and stationary blades, vanes, etc. operating in the flow path of the engine.

Each aerodynamic article, for example the airfoil of a gas turbine engine turbine blade or vane, has an external aerodynamic design shape which is selected in the design of the article to be optimum for the desired fluid flow function of the airfoil. Such function relates not only to the airfoil itself but also to the relationship and cooperation of assemblies of airfoils in a gas turbine engine and the effect such assemblies can have on other parts of the engine. The design of a blading member and its assembly in an engine balances thermal as well as mechanical conditions. Generally an airfoil operating in the strenuous environmental conditions found in the hot sections of a gas turbine engine is air cooled and frequently includes an environmental resistant surface protective layer on the outer surface of the airfoil. The external shape, including thickness, of such an outer layer along with the shape of the underlying airfoil body with which it is bonded is considered in arriving at the original airfoil design external aerodynamic shape for use in an assembly in a particular gas turbine engine.

One example of an outer protective portion or coating commonly applied to an airfoil surface such as a turbine blade or vane is a thermal barrier coating (TBC) system. Such a system generally includes a metallic bond coat bonded with an outer surface of the blade and a non-metallic ceramic type thermal resistant outer layer or TBC bonded with the bonded coat. It has been recognized that it can be beneficial to the thermal balance and to the ultimate operating life of the airfoil of a typical air cooled gas turbine engine blading member if a part of such a protective outer portion or coating system is applied only to that region of the airfoil external surface which has been observed in service operation to experience more strenuous environmental operating conditions than do other regions of the airfoil. For example, it has been observed that a region including primarily the concave surface and leading edge portion of an air cooled airfoil experiences such conditions more than does the convex surface. Therefore, it has been proposed to apply the thermal insulating portion of a protective outer coating system, for example the TBC, only to the region generally including the concave surface and leading edge portion, leaving the balance of the airfoil with the bond coat or other metallic environmental resistant coating.

Such a change only in external coating distribution on an existing blade aerodynamic design without change in the combination of the shape of the airfoil body and the coating would change the external shape of the airfoil from the design external shape to one less than optimum. Change in such shape from design affects airflow characteristics and loading on the blading members and can transfer adverse loading conditions to associated engine members, for example bearings.

BRIEF SUMMARY OF THE INVENTION

The present invention provides an article having a design external shape and comprising a body including a body external surface and an outer portion including an outer portion external surface, bonded with the body external surface. The outer portion is bonded with a part but less than substantially all of the body external surface which has a first external shape less than the design external aerodynamic shape. The outer portion external surface has a second external shape less than the design external aerodynamic shape. However, the combination of the first and second external shapes together define an article surface of the design external shape.

In another form, the present invention provides a method for making such an article in which the design external aerodynamic shape is selected from an existing article. The existing article includes a first body having a first body external surface defining a first body external shape and an outer portion including a first outer portion external surface which substantially defines the external aerodynamic design shape, the outer portion of the existing article being bonded with substantially all of the first body external surface. A replacement outer portion is selected of an amount less than the first outer portion and bonded with a region less than substantially all of a replacement body external surface. The replacement outer portion has an external surface which defines less than the external aerodynamic design shape. Selected is a replacement body having the replacement body external surface and a replacement body external shape different from the first body external shape substantially by that amount. The replacement body is made with the replacement body external shape. Then the replacement outer portion is bonded with the region of the replacement body external surface, whereby the external surfaces of the replacement body and the replacement outer portion together define the external aerodynamic design shape.

DETAILED DESCRIPTION OF THE INVENTION

Power generating apparatus using a fluid, for example a gas turbine engine using air and combustion products, is designed aerodynamically to operate as efficiently as the materials of construction will allow. Because operating conditions can exceed the capabilities of the materials, protective thermal and/or environmental resistant layers or coatings are used, such as on the blade airfoil and platform, alone or in combination with internal air cooling. One example of an environmental protective and thermal insulating outer portion or coating currently used on turbine blades in a gas turbine engine is the well known TBC system, including a metallic bond coat diffused with the blade substrate and a ceramic outer TBC bonded with the bond coat.

It has been recognized that a better balance of thermal and mechanical properties in such a blade can be achieved by applying the outer thermal insulating portion of the coating system only to regions of the blade which have been observed from service operation to have experienced more strenuous environmental operating conditions than do surfaces of the blade outside of such region. Typically, it has been observed that in general the concave and leading edge portions of the blade experience such conditions more than do the convex and platform portions. However, changing such a coating type, thickness and/or distribution in that manner on an existing blade can change the external aerodynamic shape of the blade and can have significant adverse effect on the operation of an engine.

Existing blading members have an external design aerodynamic shape selected to be substantially optimum with such a coating system fully about all external surfaces of the airfoil. Such members are positioned in an assembly designed to provide a particular fluid flow and a certain load range on associated engine components, for example rotor bearings. Rather than requiring redesign of a major part of an engine to enable use of a blading member with such better outer portion or coating distribution, the present invention provides, in one form, an article which maintains the original design external aerodynamic shape by changing the shape of a body portion of the article to compensate for the amount of outer or coating material eliminated from selected portions of a surface of the article.

Figure 1:
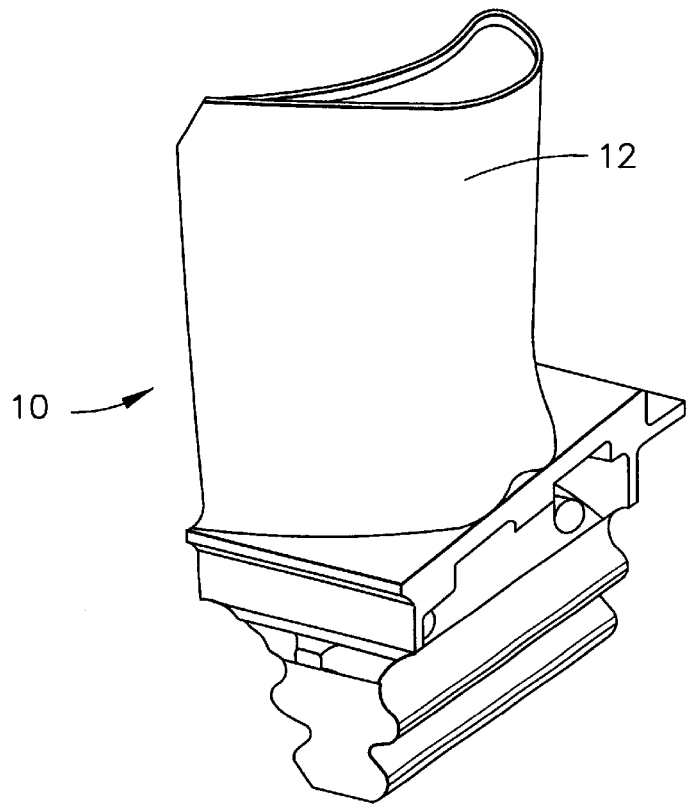
FIG. 1 is a perspective view of a typical gas turbine engine turbine blade from the convex side.
Figure 2:
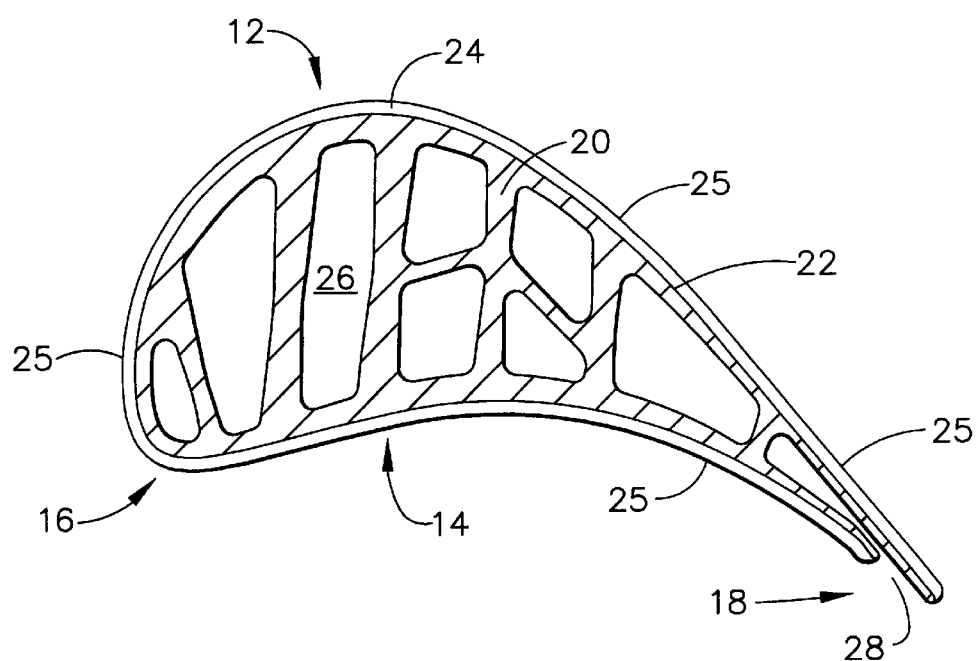
FIG. 2 is a sectional view of the profile of an air cooled turbine blade airfoil generally of the type shown in FIG. 1 and including an outer protective coating on substantially all of the airfoil surface.

The present invention will be more fully understood by reference to the drawings in which FIG. 1 is a perspective view of a typical turbine engine turbine blade 10 shown from the airfoil convex side 12. FIG. 2 is a sectional view of the profile of an air cooled turbine blade airfoil generally of the type shown in FIG. 1, and including concave side 14, leading edge 16, and trailing edge 18. Airfoil body 20, such as of a metallic material for example a Ni base superalloy, includes an outer surface 22 to which is bonded an environmental resistant protective outer portion or coating 24, in FIG. 2 shown to be substantially fully about body 20. Outer portion 24 includes an external surface 25 which defines a design external aerodynamic shape of the airfoil. One form of such an outer coating is the above described TBC system which includes a metallic bond coat diffused with body 20 and a thermal insulating outer portion or TBC bonded with the bond coat. Internal passages 26 enable cooling air to pass through the internal portions of the airfoil, the air being discharged from openings through outer surface 22 such as openings or cooling slots 28 at trailing edge 18. Coating 20 is not included at the trailing edge cooling openings as shown, and therefore the term "substantially fully about body 20" is used to describe such conditions in FIG. 2.

Figure 3:
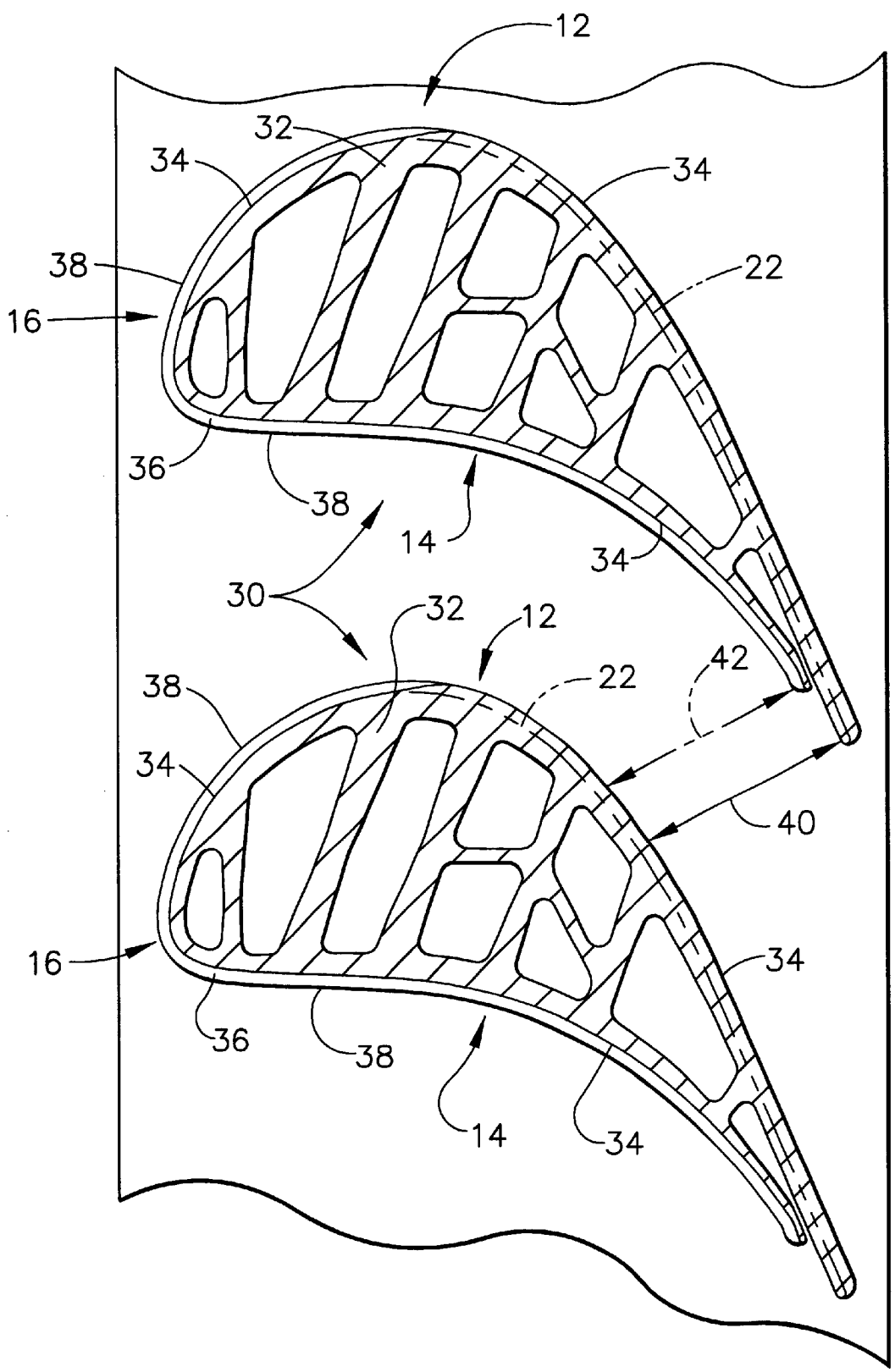
FIG. 3 is a diagrammatic fragmentary sectional view of an assembly of the type of airfoil shown in FIG. 2, each airfoil including a partial outer protective layer.

As was discussed above, changing the extent of outer portion or coating 24 in an existing blade design, such as is shown in FIG. 2, to limit at least a portion of the coating to less than that of coating 24, for example to the selected region or regions, can change adversely the design external aerodynamic shape of the airfoil as defined by surface 25. In one form, the present invention provides a replacement article which retains such original design shape. The diagrammatic, fragmentary, sectional view of FIG. 3 shows a fragment of an assembly, for example a turbine rotor assembly, of a plurality of such an article shown as a replacement blade airfoil generally at 30. Airfoil 30 includes a replacement body 32 having a body external surface 34 defining an external shape different from the external shape defined by external surface 22 of body 20 in FIG. 2 and less than the design external aerodynamic shape. Airfoil 30 also includes a replacement protective outer portion 36 having an external surface 38 of an amount less than that of outer portion 24 in FIG. 2 and less than the design external aerodynamic shape. In FIG. 3, outer portion 36 is retained on a selected region of external surface 34 including the surface of concave side 14 and leading edge 16 but not retained on surfaces outside of such region, for example substantially not on the surface of convex side 12. Therefore, external surface 38 of outer portion 36 no longer alone defines the design external aerodynamic shape as did external surface 25 in FIG. 2. As before, the trailing edge 18 did not include the complete protective outer portion 36. For example during evaluation of the present invention with a TBC system, replacement protective outer portion was the ceramic type TBC, while the metallic bond coat, representing a metallic environmental resistant coating, was retained over substantially the entire outer surface 34.

In FIG. 2, the design external aerodynamic shape of the existing blade airfoil was defined by the shape of external surface 25 of outer portion or coating 24. That design external aerodynamic shape was retained in replacement blade 30 in FIG. 3 by the combination of the external shapes of external surfaces 34 and 38 respectively of replacement body 32 and replacement outer portion 36. In order to provide such combination, the dimensions of replacement body 32 was changed, in this example increased, in an amount representing the eliminated part of outer portion 24 in FIG. 2. The original location of body outer surface 22 on convex side 12 in FIG. 2 is shown in phantom at 22 in FIG. 3, which also shows the location of outer surface 34 of replacement body 32 on that convex side 12. Replacement body 32 was increased by the amount shown in FIG. 3 on convex side 12 between surface 34 and phantom surface 22. Typically in gas turbine engine turbine blading members, such amount is in the range of about 0.001–0.01" in cross sectional thickness, and more frequently in the range of about 0.005–0.01".

As was mentioned above, dimensional changes of articles which result in change of the aerodynamic flow characteristics of an article such as a gas turbine engine blade airfoil assembled in an engine can result in undesirable loads on associated components such as rotating bearings. For example, in FIG. 3 a throat area 40 in the flow path between airfoils 30 is selected in the design of the engine and its components. If outer portion or coating 24 in FIG. 2 is eliminated from a part of body external surface 22 to the position shown by phantom line 22 in FIG. 3, a new throat area would be defined by phantom line 42. The result could be a load on a turbine rotor bearing outside of its design load range, affecting bearing life. The present invention avoids such undesirable condition.

One form of the present invention provides a replacement article, for example an airfoil, which changes dimensions of article members defining a design external aerodynamic shape of a preexisting article through a combination of external surfaces of replacement members of the article. For example, the design external aerodynamic shape defined by external surface 25 of coating 24 in FIG. 2 is retained in a replacement airfoil 30 in FIG. 3 by the combination of the external surfaces 34 and 38 respectively of replacement body 32 and of replacement outer portion or coating 36.

The manufacture of most current air cooled gas turbine engine high pressure turbine blades made of a high temperature alloy, for example a Ni base superalloy, uses precision casting of a type generally based on the lost wax process. The waxes and molds are prepared to include a selected designed external shape of the airfoil so that the aerodynamic external shape of the precision cast product is to such design shape. Generally, the airfoil later is covered with an external protective environmental layer or coating, frequently to a total dimensional increase in the range of about 0.005–01". One form of the present invention provides a method for integrating precision casting and coating of the casting to enable retention of a pre-existing design external aerodynamic shape.

According to such method form, a design external aerodynamic shape is selected from an existing article, for example an airfoil. With reference to FIG. 2, such an article includes a first body 20 having a first body external surface 22 defining the first body external shape, and a first outer portion 24 including a first outer portion external surface 25 which substantially defines the design external aerodynamic shape. The first outer portion 24 is bonded with substantially all of the first body external surface 22, excluding trailing edge 18, as shown.

For making an article substantially of that design external aerodynamic shape with an outer portion of dimensions less than outer portion 24, a replacement protective outer portion 36 in FIG. 3 was selected for bonding to a region less than substantially all of external surface 34 of a selected replacement body 32. External surfaces 34 and 38 respectively of replacement body 32 and replacement outer portion 36 each defined less than the design external aerodynamic shape. However, in combination together such external surfaces substantially defined such shape.

After selection of the replacement outer portion and replacement body, the replacement body was made to include the replacement body external shape, for example by precision casting. Then the replacement outer portion was bonded with the region of the replacement body external surface. In one evaluation of the present invention, a TBC system coating was applied to the replacement body external surface by first applying and diffusing a metallic bond coat with substantially the entire replacement body external surface 34. Then a replacement outer portion 36 in the form of a ceramic TBC was applied and bonded with the replacement body through the bond coat only in the selected region. In this way, an article which replaced a preexisting article was provided with the design external aerodynamic shape of the preexisting article The present invention has been described in connection with specific examples, embodiments, shapes, materials, etc. However, it should be understood that they are intended to be representative of the present invention and in no way limiting on its scope. Those skilled in the various arts involved will understand that the invention is capable of variations and modifications without departing from the scope of the appended claims.

What is claimed is:

1. An article comprising a body including a body external surface and an outer portion including an outer portion external surface, the outer portion being bonded with the body external surface, the article having a design external aerodynamic shape, wherein:

the outer portion is bonded with a part but less than substantially all of the body external surface;
   the body external surface has a first external shape less than the design external aerodynamic shape,
   the outer portion external surface has a second external shape less than the design external aerodynamic shape; and,
   the first and second external shapes together define an article surface of the design external aerodynamic shape.

2. The article of claim 1 which includes an airfoil having a design external aerodynamic shape defined by the first and second external shapes.

3. The article of claim 2 in which:

the body external surface includes a region which is less than all of the article surface, and is selected from the article surface which has been observed to experience more strenuous environmental operating conditions during service operation than the article surface outside of the region; and,
   the outer portion is bonded with the region of the body external surface.

4. The article of claim 3 in which:

the airfoil surface includes a concave surface, a convex surface, and a leading edge surface between the concave surface and the convex surface; and,
   the region includes at least a part of the concave surface and the leading edge surface.

5. In a method for making the article of claim 1, the steps comprising:

selecting a design external aerodynamic shape from an existing article which includes a first body having a first body external surface defining a first body external shape, and a first outer portion including a first outer portion external surface which substantially defines the design external aerodynamic shape, the first outer portion being bonded with substantially all of the body external surface;
   selecting a replacement outer portion of an amount less than the first outer portion and bonded with a region less than substantially all of a replacement body external surface, the replacement outer portion having a replacement portion external surface which defines less than the external aerodynamic design shape;
   selecting a replacement body having the replacement body external surface and a replacement body external shape different from the first body external shape substantially by the amount;
   making the replacement body with the replacement body external shape; and,
   bonding the replacement outer portion with the region of the replacement body external surface;
   whereby the external surfaces of the replacement body and the replacement outer portion together define the external aerodynamic design shape.

6. The method of claim 5 in which:

the article includes an airfoil; and,
   external surfaces of the replacement body and the replacement outer portion are surfaces of the airfoil.

7. The method of claim 6 for making a gas turbine engine blading member including a replacement body of a high temperature alloy and a replacement protective outer portion of an environmental resistant coating, wherein:

the replacement body is made by precision casting the replacement body to provide the replacement body external shape; and,
   bonding the coating to the replacement body external surface, the coating having a coating external shape of substantially the replacement outer portion external shape;
   the replacement body external shape and the coating external shape together defining the external aerodynamic design shape.

8. The method of claim 7 in which the amount is in the range of about 0.001–0.01" in cross section thickness.

9. The method of claim 7 in which the coating is a thermal barrier coating system.

* * * * *